(12) United States Patent
Grein et al.

(10) Patent No.: US 11,896,925 B2
(45) Date of Patent: Feb. 13, 2024

(54) COALESCENCE SEPARATOR, IN PARTICULAR FOR USE IN A COMPRESSED AIR COMPRESSOR SYSTEM, COMPRESSED AIR COMPRESSOR SYSTEM, AND USE OF A COALESCENCE SEPARATOR

(71) Applicant: MANN+HUMMEL GmbH, Ludwigsburg (DE)

(72) Inventors: Thomas Grein, Eggenstein-Leopoldshafen (DE); Klemens Dworatzek, Edingen (DE); Markus Zuerker, Dudenhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 651 days.

(21) Appl. No.: 17/008,915

(22) Filed: Sep. 1, 2020

(65) Prior Publication Data
US 2021/0046409 A1     Feb. 18, 2021

Related U.S. Application Data

(63) Continuation of application No. PCT/EP2019/055088, filed on Mar. 1, 2019.

(30) Foreign Application Priority Data

Mar. 1, 2018 (DE) .................. 10 2018 001 601.4

(51) Int. Cl.
*B01D 46/00* (2022.01)
*B01D 39/20* (2006.01)
(Continued)

(52) U.S. Cl.
CPC ..... *B01D 46/0031* (2013.01); *B01D 39/2024* (2013.01); *B01D 46/2411* (2013.01);
(Continued)

(58) Field of Classification Search
None
See application file for complete search history.

(56) References Cited

U.S. PATENT DOCUMENTS 4,878,929 A    11/1989   Tofsland et al.
5,820,646 A * 10/1998   Gillingham .......... B01D 25/305
                                                                  55/498
(Continued)

FOREIGN PATENT DOCUMENTS

AM             2755 A * 7/2013
AU     2003211146 A1 * 9/2003 ........... A61K 31/135
(Continued)

OTHER PUBLICATIONS

Espacenet translation of DE 102017010021 A1, all pages (Year: 2019).*
English version of WO-2012088317-A2 (Year: 2012).*

*Primary Examiner* — Brit E. Anbacht

(57) ABSTRACT

A coalescence separator for separating liquid droplets from a gas flow is provided with a multilayer structure of a coalescence filter medium as a finest stage of the coalescence separator. The multilayer structure of the coalescence filter medium is arranged between a gas inlet and a gas outlet and surrounds a cavity. A product of an air permeability of the coalescence filter medium and a grammage of the coalescence filter medium amounts to at least 16 g/m*s and maximally 100 g/m*s. The coalescence filter medium is a glass fiber paper. The coalescence separator is used, for example, as a main oil separator in screw compressors.

28 Claims, 3 Drawing Sheets

(51) Int. Cl.
  *B01D 46/24* (2006.01)
  *B01D 46/52* (2006.01)
  *B01D 46/58* (2022.01)

(52) U.S. Cl.
  CPC ........... *B01D 46/528* (2013.01); *B01D 46/58* (2022.01); *B01D 2239/1233* (2013.01); *B01D 2239/1258* (2013.01)

(56) References Cited

U.S. PATENT DOCUMENTS

| | | | | |
|---|---|---|---|---|
| 6,187,073 | B1* | 2/2001 | Gieseke | B01D 46/2411 55/318 |
| 2008/0250772 | A1 | 10/2008 | Becker et al. | |
| 2009/0020486 | A1* | 1/2009 | Barnwell | B01D 46/0041 210/90 |
| 2012/0107588 | A1* | 5/2012 | Sealey | B01D 46/0001 428/219 |
| 2012/0234748 | A1* | 9/2012 | Little | D04H 1/5412 210/488 |
| 2013/0291499 | A1* | 11/2013 | Gardner | B01D 46/2411 55/423 |
| 2014/0033668 | A1* | 2/2014 | Kleynen | B01D 29/21 55/502 |
| 2014/0130469 | A1* | 5/2014 | Nagy | B01D 39/163 55/486 |
| 2015/0078767 | A1* | 3/2015 | Momma | G03G 15/2032 399/33 |
| 2017/0341006 | A1* | 11/2017 | Boesner | B01D 39/18 |
| 2018/0272255 | A1 | 9/2018 | Thomson et al. | |
| 2020/0248597 | A1* | 8/2020 | Grein | B01D 39/2024 |

FOREIGN PATENT DOCUMENTS

| | | | | |
|---|---|---|---|---|
| DE | 102017010021 | A1 * | 5/2019 | ........... B01D 17/045 |
| EP | 2777795 | A1 * | 9/2014 | ............... A47L 9/14 |
| EP | 3915647 | A1 * | 12/2021 | ............... A41D 13/11 |
| WO | WO-2012088317 | A2 * | 6/2012 | ............... B01D 29/21 |
| WO | WO-2015079394 | A1 * | 6/2015 | ......... B01D 17/0202 |
| WO | WO-2015189102 | A1 * | 12/2015 | ........... B01D 39/163 |
| WO | 2017137335 | A1 | 8/2017 | |
| WO | WO-2017187021 | A1 * | 11/2017 | ........... B01D 39/163 |
| WO | WO-2018178184 | A1 * | 10/2018 | ......... B01D 39/1623 |
| WO | WO-2020127065 | A1 * | 6/2020 | ............... A47L 9/14 |
| WO | WO-2021255402 | A1 * | 12/2021 | ......... B01D 39/1623 |

* cited by examiner

COALESCENCE SEPARATOR, IN PARTICULAR FOR USE IN A COMPRESSED AIR COMPRESSOR SYSTEM, COMPRESSED AIR COMPRESSOR SYSTEM, AND USE OF A COALESCENCE SEPARATOR

CROSS-REFERENCE TO RELATED APPLICATIONS

This application is a continuation application of international application No. PCT/EP2019/055088 having an international filing date of 1 Mar. 2019 and designating the United States, the international application claiming a priority date of 1 Mar. 2018 based on prior filed German patent application No. 10 2018 001 601.4, the entire contents of the aforesaid international application and the aforesaid German patent application being incorporated herein by reference.

TECHNICAL FIELD

The invention concerns a coalescence separator for separating liquid droplets from a gas flow, in particular for use as main oil separator of an oil separation system of a screw compressor, in particular for oil concentrations of at least 0.1 g/m$^3$ (volume in relation to standard conditions), comprising as finest stage a multilayer structure of a coalescence filter medium that can be arranged between the gas inlet and the gas outlet, is in particular wound, and surrounds a cavity.

BACKGROUND OF THE INVENTION

For stationary and movable compressed air devices, screw compressors are used in general. The compressors used for this purpose generate a pressure of up to approximately 20 bar, typically approximately 7 to 8 bar, and require oil for lubrication and cooling of the intermeshing screws of the compression stage. The oil supplied for this purpose is introduced into the compressed air flow and must be separated prior to use of the compressed air at dispensing locations and returned again to the oil circuit. Approximately 5 liters of oil per cubic meter of air are injected into the screw compressor; air/oil separation of the compressed air is therefore an important measure. In order to regain most of this oil and to separate the oil from the compressed air, coalescence separators in the form of air/oil separator elements (air/oil separator inserts) insertable into the pressure containers or air/oil separator boxes in the form of exchangeable filters (so-called spin-on filters) are used which are to be regularly exchanged during servicing of the device. They separate most of the oil present in the compressed air. In general, there are still post separators arranged downstream which can still separate finest drops and/or oil in minimal concentration.

For such applications, it is known to employ coalescing filter media. In these, oil droplets catch at the fibers and combine to larger droplets which then drain off. For oil separation in compressors, in general two-stage main separator coalescence filter bodies are used in which a plurality of layers of a coarse glass fiber paper are used upstream of a plurality of layers of a finer glass fiber paper. The finer layers arranged downstream serve to separate the droplets which have not yet been caught at the coarser regions. At the downstream side of the coalescing filter body, significant quantities of oil drain off so that, due to the air flowing through, bubble formation may occur so that droplets can be generated again at the clean side. In order to catch these and to improve drainage, downstream of this coalescence filter body in general an open-pore drainage nonwoven is arranged which in particular can serve additionally as a post separator for drops produced by bubble formation.

SUMMARY OF THE INVENTION

The invention has the object to further develop a coalescence separator of the aforementioned kind such that its function is optimized, in particular that the pressure loss of the coalescence separator is improved.

This object is solved by a coalescence separator characterized in that the product of air permeability and grammage of the coalescence filter medium amounts to at least 16 g/m*s, in particular at least 18 g/m*s, preferably at least 25 g/m*s, further preferred at least 35 g/m*s, and maximally 100 g/m*s, preferably maximally 80 g/m*s, particularly preferred maximally 50 g/m*s.

The object is solved by a compressed air compressor system comprising a pressure container for stationary compressors or a separator cartridge housing embodied as a spin-on filter and mountable on a connecting head, further comprising the coalescence separator characterized in that the product of air permeability and grammage of the coalescence filter medium amounts to at least 16 g/m*s, in particular at least 18 g/m*s, preferably at least 25 g/m*s, further preferred at least 35 g/m*s, and maximally 100 g/m*s, preferably maximally 80 g/m*s, particularly preferred maximally 50 g/m*s, which is arranged exchangeably in the pressure container or in the separator cartridge housing so as to be exchangeable together therewith.

The object is solved by a use of a coalescence separator as main oil separator downstream of a screw compressor for separating liquid droplets from a gas flow, preferably in a compressed air compressor system, wherein the coalescence separator is characterized in that the product of air permeability and grammage of the coalescence filter medium amounts to at least 16 g/m*s, in particular at least 18 g/m*s, preferably at least 25 g/m*s, further preferred at least 35 g/m*s, and maximally 100 g/m*s, preferably maximally 80 g/m*s, particularly preferred maximally 50 g/m*s, and preferably provided with a fine coalescing separator, arranged downstream of the coalescence separator, for post separation of residual oil in the compressed air flow.

Accordingly, the invention is based on using a multilayer structure preferably of an in particular wet-laid glass fiber paper for oil separation. The multilayer structure according to the invention with its comparatively open structure can be used surprisingly as efficient final separator and as sole and/or finest (main) separation stage, in particular no finer fine separation stages or fine separation layers or layer types of different fineness are required within a coalescence filter body or exchangeable coalescence separator insert (also referred to as coalescence separator element) in addition to the glass fiber paper used in the multilayer structure.

It was surprisingly found that coalescence filter media that exhibit a defined product of grammage and air permeability are suitable for use in a coalescence separator, in particular for high oil volume flows, without requiring, as is common in the prior art, the use of a second finer and denser layer arranged downstream for achieving the degree of separation required for the application. Due to the possibility of eliminating the second more finely separating layer arrangement, the negative effect of additional fine separation layers on pressure loss is eliminated, surprisingly without having to accept disadvantages in the degree of separation in the separation of oil aerosol from the compressed air of a screw compressor.

The coalescence separator according to the invention serves for and is designed for the separation of liquid droplets from a gas flow, in particular for use as a main oil separator of an oil separation system of a screw compressor, in particular for oil concentrations of at least 0.1 g/m³ (volume in relation to standard conditions) and comprises a preferably wound multilayer structure of a coalescence filter medium that can be arranged between the gas inlet and the gas outlet and that surrounds a cavity. The coalescence filter medium is embodied such that the product of air permeability and grammage of a single layer of the coalescence filter medium amounts to at least 16 g/m*s, in particular at least 18 g/m*s, preferably at least 25 g/m*s, further preferred at least 35 g/m*s. In a preferred embodiment, the product of air permeability and grammage of a single layer of the coalescence filter medium is maximally 100 g/m*s, preferably maximally 80 g/m*s, particularly preferred maximally 50 g/m*s. Preferably, it is provided that the multilayer structure as coalescence filter medium comprises a plurality of layers of a glass fiber paper arranged on top of each other and flowed through sequentially and is comprised preferably substantially or exclusively, at least with regard to the properties that determine the separation efficiency, of a glass fiber paper. This means that it is possible to provide protective or supporting layers that do not affect the pressure loss and the separation efficiency, for example, of fleecy plastic nonwoven or in particular pressure-stable meshes or nets. As an alternative to the preferred wound arrangement of a strip-shaped coalescence filter medium strip for forming a multilayer structure, a plurality of coalescence filter medium sheets, cut to size, can also be arranged on each other to a block-type stack.

The grammage results from the quantity of the fibers that are present per surface unit in the coalescence filter medium and are substantially and preferably completely glass fibers for the present application. Minimal proportions of binding agents or binding fibers of other materials have in general a subordinate effect on the grammage in this context. The air permeability depends on the diameter of the employed fibers, the type and the proportion of binders, and the porosity.

Preferably, the multilayer structure is fastened sealtightly, for example, glued or clamped, between two in particular round end discs for lateral sealing action. In this way, an exchangeable coalescence separator insert can be formed.

In a preferred embodiment, it is provided that the individual layer thickness of the coalescence filter medium amounts to more than 0.1 mm, in particular more than 0.3 mm, preferably more than 0.4 mm, particularly preferred more than 0.6 mm, and maximally 2 mm, in particular maximally 1 mm, preferably maximally 0.8 mm. In this way, the multilayer structure can be produced reliably.

In a preferred embodiment, it is provided that the grammage of the individual layer of the coalescence filter medium is larger than 40 g/m², preferably larger than 50 g/m², particularly preferred larger than 70 g/m², and less than 200 g/m², preferably less than 150 g/m², particularly preferred less than 100 g/m². The multilayer structures, in particular wound multilayer structures, can be reliably constructed within this range of grammage.

In a preferred embodiment, it is provided that the coalescence filter medium comprises a mass to volume ratio of less than 170 kg/m³, in particular less than 150 kg/m³, preferably less than 140 kg/m³, particularly preferred less than 120 kg/m³, and larger than 80 kg/m³, in particular larger than 100 kg/m³, preferably larger than 110 kg/m³. For usual densities of glass fibers, this means a porosity of preferably minimally 93% (corresponds to mass to volume ratio of approximately 170 kg/m³). It was surprisingly found that such comparatively porous individual layers can be used in order to achieve satisfactory degrees of separation with acceptable stack dimensions without having to use additionally a fine stage when a multilayer structure according to the invention with the product values of air permeability and grammage amounting to at least 16 g/m*s, in particular at least 18 g/m*s, preferably at least 25 g/m*s, further preferred at least 35 g/m*s, and maximally 100 g/m*s, preferably maximally 80 g/m*s, particularly preferred maximally 50 g/m*s, is used. At least partially improved pressure losses can be achieved in this context. Further preferred is a porosity of preferably maximally 96% (corresponds to mass to volume ratio of approximately 100 kg/m³). This contributes to a good processability of the filter media. Furthermore, it is preferred that the coalescence filter medium has an air permeability of the individual layer of more than 180 l/m²s (liter per square meter and second), in particular more than 200 l/m²s, preferably more than 300 l/m²s, particularly preferred more than 400 l/m²s, and maximally 1,500 l/m²s, in particular maximally 1,000 l/m²s, preferably maximally 750 l/m²s, particularly preferred maximally 500 l/m²s. In this way, the separation efficiency in the field of the air/oil separation of compressors can be optimized.

In a preferred embodiment, it is provided that the multilayer structure comprises between 2 and 80, in particular between 10 and 30, layers of the coalescence filter medium, preferably immediately arranged on each other, which are either stacked or wound. In this way, a stable coalescence separator can be provided that fulfills the separation efficiency requirements.

In a preferred embodiment, it is provided that the coalescence filter medium is a single layer wherein the single layer is preferably homogenous. Homogenous means in relation to the single layer that no irregularity (changes of the porosity or fiber fineness across the thickness of the coalescence filter medium) which surpasses the irregularity caused by the manufacturing method is present within the coalescence filter medium. In this way, in one process step, in particular a single winding process, a multilayer structure, which is satisfactory for the total separation efficiency and which, as further preferred, is also constructed homogenous to this effect across its total thickness, can be made available from a coalescence filter medium.

The multilayer structure is preferably embodied as a single web, i.e., it is preferably wound from a single continuous web. In this way, a homogenous construction of the multilayer structure can be ensured.

In a preferred embodiment, it is provided that the total thickness of the multilayer structure amounts to at least 8 mm, preferably at least 10 mm, particularly preferred at least 12 mm. In this way, a multilayer structure that fulfills the separation efficiency requirements can be provided. In this context, the total thickness of the multilayer structure amounts to maximally 60 mm, preferably maximally 50 mm, in order to fulfill installation space requirements in pressure containers of compressors. Particularly preferred, the total thickness of the multilayer structure amounts to maximally 25 mm. In this way, a satisfactory separation efficiency as well as the installation space requirements for use in air/oil separation boxes in the form of exchangeable filters (so-called spin-on filters) can be fulfilled.

In a preferred embodiment, it is provided that the total air permeability of the multilayer structure is less than 100 l/m²s, in particular less than 70 l/m²s, preferably less than 50 l/m²s, and particularly preferred less than 30 l/m²s. This contributes to fulfilling the requirements in regard to the total separation efficiency for the air/oil separation of compressors.

In a preferred embodiment, it is provided that the glass fibers in the coalescence filter medium comprise a mass proportion of at least 50%, in particular 90%, preferably at least 93%, particularly preferred at least 95%. Moreover, it is preferred that the mass proportion of incinerable materials in the coalescence filter medium amounts to maximally 10%, preferably maximally 7%, particularly preferred maximally 5%. The coalescence filter medium can comprises a binder with a mass proportion of maximally 10%, preferably maximally 7%, particularly preferred maximally 5%, that preferably comprises no bi-component fibers, particularly preferred no fusible fibers, and, for example, is an acrylate binder. A high glass fiber proportion enables a good degree of separation while having satisfactory stability for compressed air systems.

In a preferred embodiment, it is provided that the fibers of the coalescence filter medium have hydrophobic and/or oleophobic properties. The repellent finish of the fibers or of a portion of the fibers can contribute to improving the drainage and the pressure loss in the oil-saturated state.

In a preferred embodiment, it is provided that at least 90%, preferably at least 95%, of the glass fibers of the coalescence filter medium have a fiber diameter of larger than 0.5 μm, preferably larger than 1 μm. Moreover, it is preferred that at least 90%, preferably at least 95% of the glass fibers of the coalescence filter medium have a fiber diameter of less than 10 μm, preferably less than 8 μm, particularly preferred less than 6 μm. In this way, a multilayer structure with a structure optimized for separation of oil from compressed air can be provided.

In a preferred embodiment, it is provided that the finest separation stage of the coalescence separator is formed by the multilayer structure and/or the coalescence filter medium. In this context, the thickness-related separation efficiency that is in particular determined by fiber diameter and pore size and/or air permeability is to be understood as fineness. The elimination of finer layers is enabled by the afore described properties and can thus contribute to a pressure loss that is optimized with regard to the separation efficiency and the installation space. Therefore, it is preferred when the multilayer structure and/or the coalescence filter medium form the separation stage that determines at least mostly the efficiency of the coalescence separator.

In a preferred embodiment, at the clean side of the multilayer structure of the coalescence filter medium, a drainage layer, preferably a drainage nonwoven, is arranged which is of an open pore structure in comparison to the coalescence filter medium. Preferably, in case of a wound multilayer structure, the latter is surrounded by an open pore drainage nonwoven for flow from the interior to the exterior, or, for a flow from the exterior to the interior, the multilayer structure surrounds the drainage nonwoven. In the first case, the drainage nonwoven is preferably arranged without a spacing or without an intermediate space relative to the multilayer structure and covers, further preferred, completely, its surface. In case of a flow from the exterior to the interior, the drainage nonwoven is preferably arranged within and at a spacing from the multilayer structure. This means that in case of a wound multilayer structure, the drainage nonwoven extends preferably about the entire circumference along the entire axial length of the multilayer structure. The drainage nonwoven contributes to draining off the separated liquid without already separated liquid being entrained by the flow, and it can catch such entrained droplets. As an alternative to the drainage nonwoven, as a drainage layer also open-pore foam or multilayer wound spunbonded nonwoven can be used. The drainage layer comprises preferably a grammage between 100 g/m² and 300 g/m², preferably between 200 g/m² and 250 g/m². The drainage layer comprises, further preferred, a thickness of 3 mm to 10 mm, preferably 4 mm to 6 mm. The drainage layer comprises, further preferred, an air permeability between 2,000 l/m²s and 4,000 l/m²s, preferably between 2,500 l/m²s, and 4,000 l/m²s. Preferably, a polyester material is used for the drainage layer, in particular for the drainage nonwoven. Particularly preferred are staple fiber nonwovens, in particular needled, glued, calendered or reinforced by other methods. The thickness of the drainage layer is measured presently according to DIN EN ISO 9073-2 at 0.5 kPa.

The coalescence separator according to the invention is preferably used as the first separation stage which is comprised of fibers, in particular glass fibers, and which is downstream of the screw of a screw compressor. It serves thus as a main separator and is loaded with the entire oil contents that has not been separated beforehand by swirling or baffle separation in the conduit system and pressure container. The coalescence separator according to the invention is preferably embodied as an exchangeable coalescence separator insert for exchangeable installation in a pressure container of a compressed air compressor.

The invention concerns moreover a compressed air compressor system comprising a pressure container for stationary compressors or a separator cartridge housing (in particular a so-called spin-on housing) embodied as a spin-on filter and mountable on a connecting head, further comprising a coalescence separator according to the invention that is arranged exchangeably in the pressure container or in the separator cartridge housing so as to be exchangeable together therewith.

The invention concerns moreover the use of a coalescence separator according to the invention as a main oil separator downstream of a screw compressor, preferably in a compressed air compressor system, preferably with a fine coalescence separator arranged downstream of the coalescence separator for post separation of residual oil in the compressed air flow, wherein the fine coalescence separator is preferably arranged separately, i.e., in a separate housing and/or conduit section.

For determining advantageous properties of the presently described coalescence filter medium, the following standards and measuring methods have been found to be suitable. The indicated values are determined or can be determinable with these guidelines: Material thickness in analogy to ISO 534, but with a load of 10 kPa; grammage according to DIN EN ISO 536; air permeability according to DIN EN ISO 9237 at 200 Pa (total air permeability corresponds to air permeability of the individual layer divided by the number of layers).

BRIEF DESCRIPTION OF THE DRAWINGS

As has already been explained above, there are various possibilities to embody and further develop the teachings of the present invention in an advantageous manner. In this context, on the one hand, reference is being had to the dependent claims; on the other hand, further embodiments, features, and advantages of the present invention will be explained in more detail in the following inter alia with the embodiments illustrated in FIGS. 1 to 4 as well as further examples.

In the Figures, same or functionally the same elements, if nothing to the contrary is mentioned, are provided with the same reference characters.

DESCRIPTION OF PREFERRED EMBODIMENTS

Figure 1:
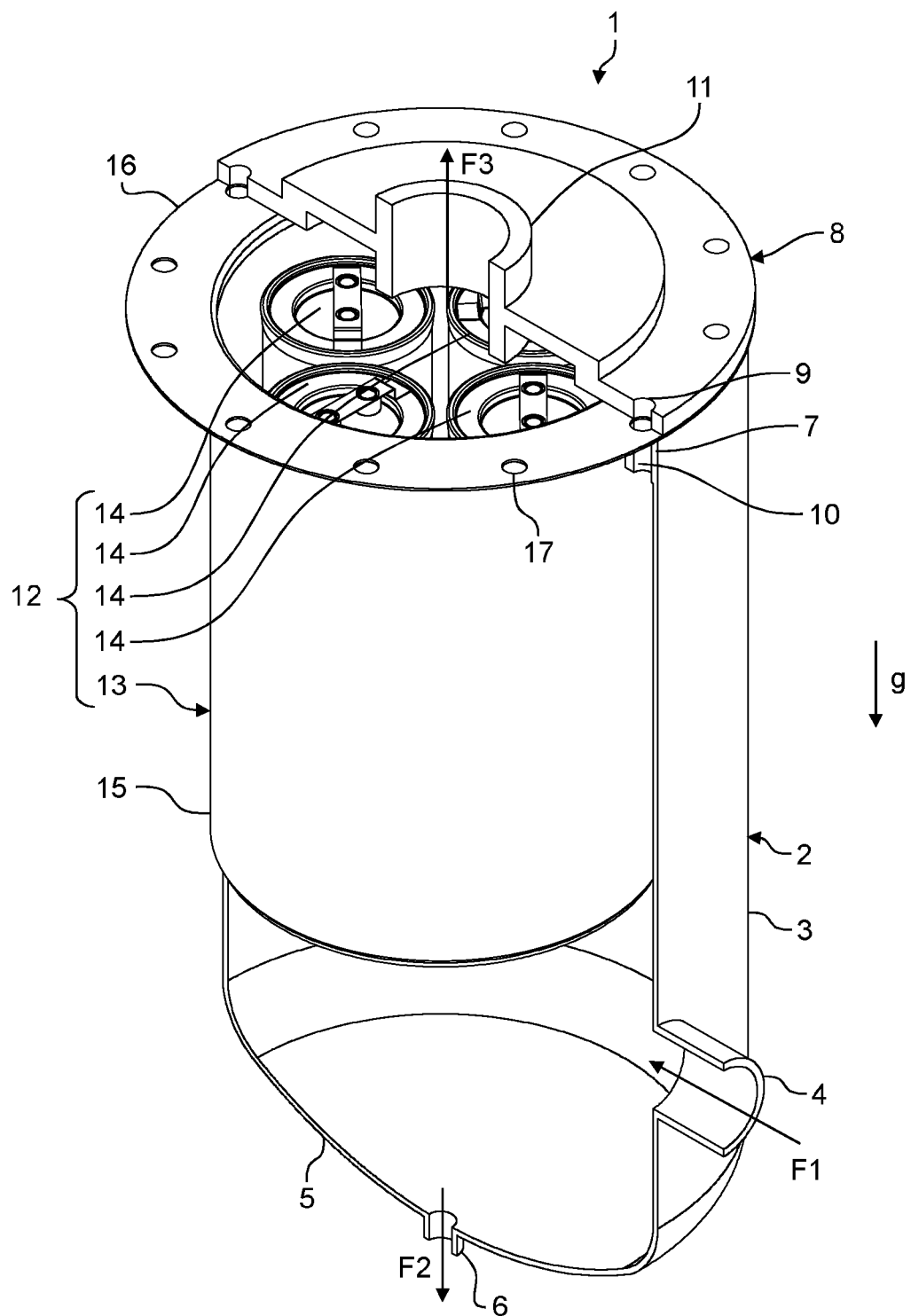
FIG. 1 shows a schematic perspective partial section view of an embodiment of a fluid separator.

FIG. 1 shows a schematic perspective partial section view of an embodiment of an oil separator or fluid separator 1. The fluid separator 1 works according to the coalescing separator principle in which liquid droplets from a gas flow deposit on the fibers of a fibrous coalescence filter medium, combine (coalesce) thereat to larger droplets, and drain off due to gravity. The fluid separator 1 is designed to separate a liquid fluid, for example, oil, from a gaseous fluid, for example, compressed air. The fluid separator 1 can be associated with a screw compressor or a screw compressing device or can be part of a screw compressor or screw compressing device.

The fluid separator 1 comprises a compressed air vessel 2 with a tubular wall 3 which may be circular in cross section. At the wall 3, a fluid inlet 4 can be provided. The fluid inlet 4 can be tubular with a circular cross section. The fluid inlet 4 penetrates the wall 3. By means of the fluid inlet 4, a fluid F1, for example, an oil/air mixture, can be supplied radially but also tangentially to the fluid separator 1. The fluid F1 can be supplied to the fluid separator 1 from the aforementioned screw-type compressing device.

At the end face, the compressed air vessel 2 is closed off by means of a curved, in particular spherically curved, bottom 5. The bottom 5 and the wall 3 can be designed monolithically. Centrally at the bottom 5, a fluid outlet 6 can be provided. By means of the fluid outlet 6, a fluid F2, for example, oil that has been separated from the fluid F1 can be discharged or removed by suction. At an end section of the wall 3 facing away from the bottom 5, the compressed air vessel 2 comprises moreover a connecting flange 7 that is embodied annularly.

The fluid separator 1 comprises moreover a cover 8 that is detachably connected to the connecting flange 7 of the compressed air vessel 2. For example, the cover 8 is connected by means of screws to the connecting flange 7. For this purpose, for example, corresponding bores 9 can be provided at the cover 8 and threaded bores 10 corresponding with the bores 9 can be provided at the connecting flange 7.

A tubular fluid outlet 11 is provided centrally at the cover 8. By means of the fluid outlet 11, a fluid F3, for example, purified compressed air, from which the fluid F2 has been separated, can be discharged. For example, the fluid F3 can be supplied to a compressed air system and consumers connected thereto. In a direction of the force of gravity g, the fluid outlet 11 is preferably arranged above the fluid inlet 4 and the fluid outlet 6.

The fluid separator 1 comprises moreover a coalescence separating arrangement 12, in particular an oil separator arrangement that is embodied as a coalescence separator. The coalescence separator arrangement 12 comprises, for example, as provided in the present embodiment, a cup-shaped filter housing 13 which forms an intermediate housing within the compressed air vessel 2 as well as a plurality of exchangeable coalescence separator inserts 14 received in the filter housing 13. The exchangeable coalescence separator inserts 14 can also be referred to as coalescence separator elements, coalescing elements, separator elements in particular oil separator elements, or filter elements. The number of exchangeable coalescence separator inserts 14 is arbitrary. For example, as shown in FIG. 1, four such exchangeable coalescence separator inserts 14 can be provided. Alternatively, for example, also two, three, four, five or more exchangeable coalescence separator inserts 14 but also only one such exchangeable coalescence separator insert 14 can be provided.

The filter housing 13 comprises a tubular wall 15 which in cross section may have a circular geometry. At one end section of the wall 15 a connecting flange 16 is provided which is arranged between the cover 8 and the connecting flange 7 of the compressed air vessel 2. This means that the connecting flange 16 can be clamped between the cover 8 and the connecting flange 7 of the compressed air vessel 2. In the connecting flange 16, bores 17 can be provided which correspond to the bores 9 of the cover 8 and the threaded bores 10 of the connecting flange 7.

Figure 2:
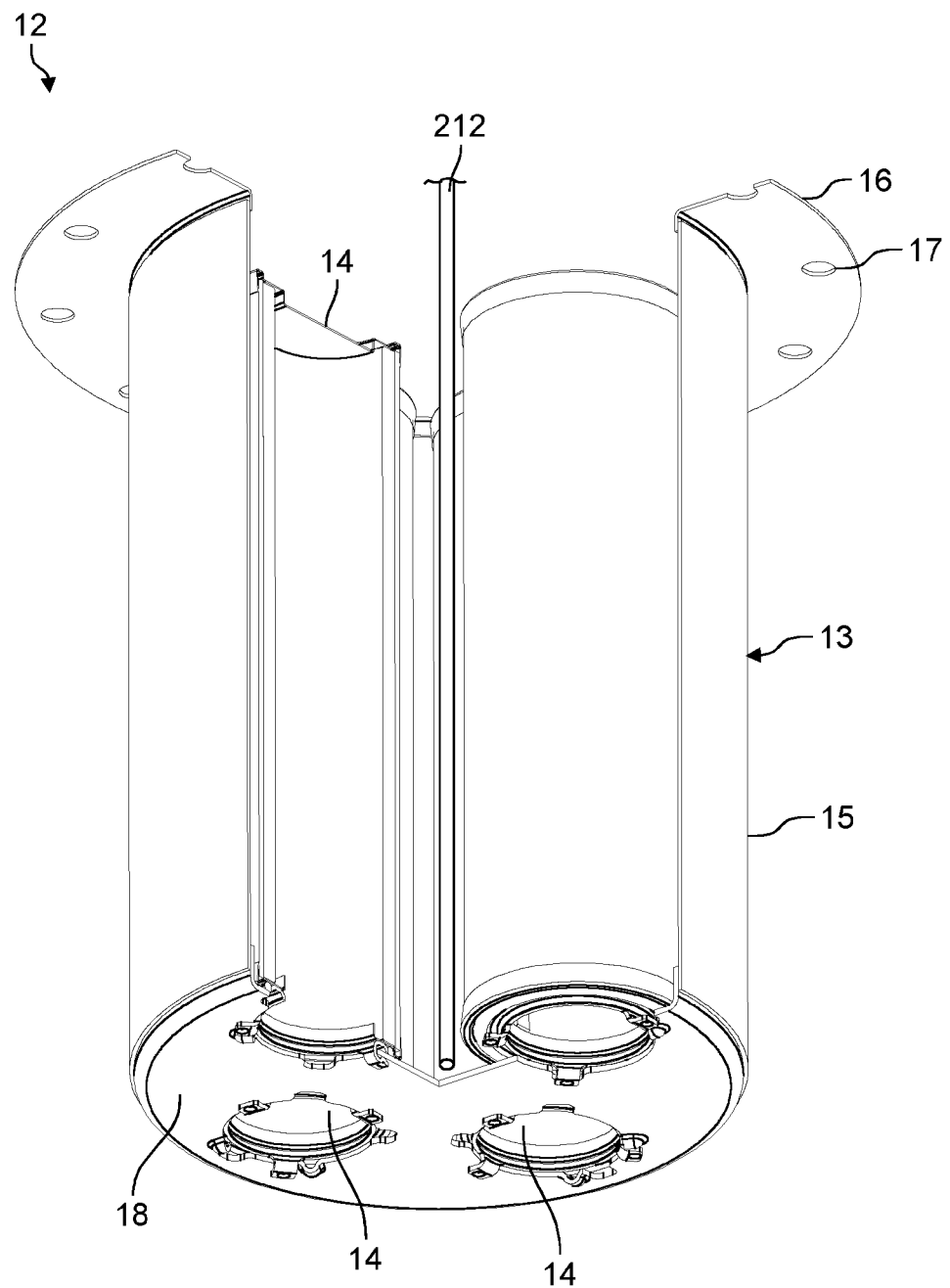
FIG. 2 shows a second schematic perspective partial section view of the fluid separator arrangement according to FIG. 1.

FIG. 2 shows a schematic perspective partial section view of the coalescence separator arrangement 12. At an end section of the wall 15 which is facing away from the connecting flange 16, a filter element adapter plate 18 is provided at which the exchangeable coalescence separator insert 14 is fastened. The filter element adapter plate 18 can be connected non-detachably or detachably, i.e., exchangeably, to the filter housing 13. For example, the filter element adapter plate 18 is screwed into the tubular wall 15 or connected thereto, for example, by means of a bayonet closure. The filter element adapter plate 18 is connected fluid-tightly with the wall 15. This means that no fluid can escape between the filter element adapter plate 18 and the wall 15. The arrangement with a plurality of exchangeable coalescence separator inserts 14 is exemplary for the present invention. Instead of an adapter plate 18 with a plurality of exchangeable coalescence separator inserts 14, a single exchangeable coalescence separator insert can also be used with the size and with the flange configuration of the adapter plate 18, as is conventional also in the prior art.

Figure 3:
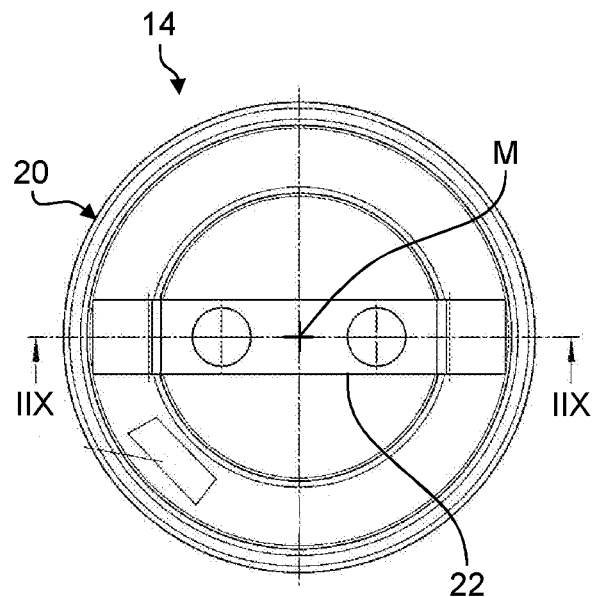
FIG. 3 shows a schematic plan view of an exchangeable coalescence separator insert which is usable in a fluid separator according to FIG. 1.
Figure 4:
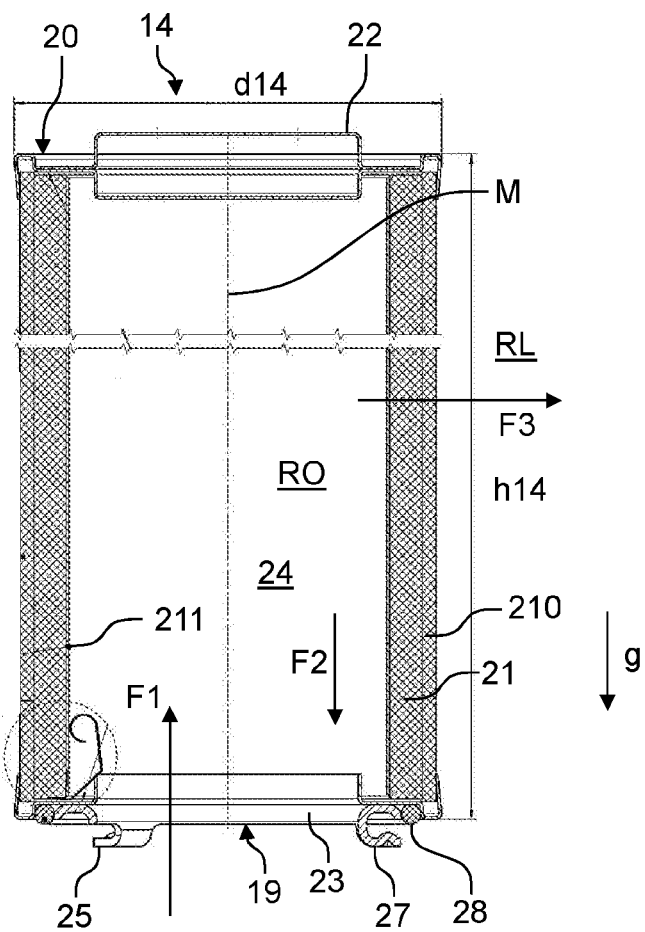
FIG. 4 shows a schematic section view of the exchangeable coalescence separator insert according to FIG. 3.

FIG. 3 shows a schematic view of the exchangeable coalescence separator insert 14 and FIG. 4 shows a schematic section view of the exchangeable coalescence separator insert 14. In the following, reference is being had to FIG. 3 and FIG. 4 at the same time.

The exchangeable coalescence separator insert 14 can be designed with rotational symmetry relative to the center axis or symmetry axis M. The exchangeable coalescence separator insert 14 comprises a first end disc 19, which is shown in FIGS. 3 and 4 in different views, and a second end disc 20. The first end disc 19 and the second end disc 20 can be manufactured, for example, of a metal material, in particular steel, or of a plastic material. Preferably, the end discs 19, 20 are manufactured of a sheet metal, in particular sheet steel, respectively.

Between the first end disc 19 and the second end disc 20, a coalescence filter medium 21 of a wound multilayer structure is arranged. A construction, in which a plurality of layers of the coalescence filter medium are placed directly, without a spacing, onto each other, preferably wound, so that a fibrous body which is substantially uniform transverse to the layer extension is created, is referred to as a multilayer structure. In this context, the coalescence filter medium 21 is preferably not folded but flat. Preferably, the coalescence filter medium 21 can be in particular a wound glass fiber nonwoven or glass fiber paper. The glass fibers are preferably micro glass fibers. The first end disc 19 and the second end disc 20 can be glued to the coalescence filter medium 21 or connected in other ways. The exchangeable coalescence separator insert 14 can comprise, for example, a height h14 of approximately 500 mm and a diameter d14 of approximately 150 mm. The second end disc 20 comprises preferably, as illustrated, a handle 22 for handling the exchangeable coalescence separator insert 14. The multilayer structure of the coalescence filter medium 21 is surrounded at the clean side by a drainage nonwoven 210 that is of an open-pore structure in comparison to the coalescence filter medium and is preferably arranged without spacing or without intermediate space relative to the multilayer structure and surrounds the latter completely. The drainage nonwoven contributes to draining off the separated liquid without the already separated liquid being entrained by the flow and can catch such entrained droplets. In an intended flow direction from the exterior to the interior, which is also possible according to the invention, the drainage nonwoven 210 is arranged within the multilayer structure of the coalescence filter medium 21.

As illustrated in FIG. 4, the exchangeable coalescence separator insert 14 has a raw side RO and a clean side RL which is separated from the raw side RO by means of the coalescence filter medium 21. The fluid F1 to be filtered flows in this context from the raw side RO through the coalescence filter medium 21 to the clean side RL wherein, by means of the coalescence filter medium 21, the fluid F2, in particular oil, can be separated from the fluid F1, in particular (compressed) air/oil mixture, and drained off so that the purified fluid F3, in particular purified (compressed) air, passing through the coalescence filter medium 21, exits at the clean side RL. The fluid F2 is separated in the coalescence filter medium 21 in small droplets which deposit on the fibers. The small droplets coalesce to larger drops that, in turn, flow along and within the coalescence filter medium 21 as well as along and within the drainage nonwoven 210 in the direction of the force of gravity g in downward direction. The separated fluid F2 therefore does not remain within the coalescence filter medium 21 but drains in downward direction and collects, for example, at the filter element adapter plate 18 of the filter housing 13, wherein the fluid F2 can be sucked away by a drainage line 212. The first end disc 19 comprises a fluid inflow opening 23 (a flow in the opposite direction is possible) that can be embodied with rotational symmetry to the symmetry axis M. Via the fluid inflow opening 23, the fluid F1 can enter the interior 24 of the exchangeable coalescence separator insert 14. Moreover, the fluid F2 can exit through the fluid inflow opening 23 from the exchangeable coalescence separator insert 14 but also via the outer rim of the lower first end disc 19. The first end disc 19 comprises moreover preferably at least three fastening elements 25 to 27, which are non-uniformly distributed about the fluid inflow opening 23, for fastening at the filter element adapter plate 18. The number of fastening elements 25 to 27 is arbitrary. Preferably, however, at least three such fastening elements 25 to 27 are provided. However, also four, five or more such fastening elements 25 to 27 can be provided.

The first or open end disc 19 can comprise moreover a sealing element 28, for example, an O-ring, in order to seal the first end disc 19 fluid-tightly relative to the filter element adapter plate 18 or a flange of the compressed air vessel 2. The fastening elements 25 to 27 are embodied to engage from behind the filter element adapter plate 18 by form fit. A form fit connection is produced by the meshing engagement or engagement from behind of at least two connecting partners, in this case the fastening elements 25 to 27 and the filter element adapter plate 18.

The fastening elements 25 to 27 can be arranged along a circle in non-uniform or non-symmetrical distribution about the fluid inflow opening 23.

Examples

Embodiments of a coalescence separator according to the invention were compared to a combined two-stage structure. In this context, for same outer dimensions different coalescence filter media were used. Degrees of separation were determined based on an aerosol with a volume-weighted average droplet size of approximately 1.1 μm. In this context, it becomes apparent that in the comparative example for same dimensions a significantly higher pressure loss must be accepted for fulfilling the market requirements.

TABLE 1

| coalescence filter medium | grammage g/m² | air permeability l/m²s | thickness mm @ 10 kPa | product grammage* air permeability g/(m*s) |
|---|---|---|---|---|
| Examples | | | | |
| Example 1 | glass fiber paper with appr. 95% glass fibers | 95 | 195 | 0.8 | 19 |
| Example 2 | glass fiber paper with appr. 95% glass fibers | 70 | 230 | 0.53 | 16 |
| Comparative examples | | | | |
| Comparative example 1 | glass fiber paper with appr. 95% glass fibers, two-stage structure (stage 1/ stage 2) | 70/89 | 230/130 | 0.5/0.59 | 16/10 |

| | proportion of fibers smaller than 3 μm | layers | degree of separation % | pressure difference mbar |
|---|---|---|---|---|
| Examples | | | | |
| Example 1 | <10% | 15 | fulfills market requirements | 80 |
| Example 2 | <10% | 20 | fulfills market requirements | 92 |
| Comparative examples | | | | |
| Comparative example 1 | <10% | 5/10 | fulfills market requirements | 127 |

In the examples 1 and 2 in Table 1, the described multilayer structures were used as the only main separation stage, i.e., the coalescence separators had no finer separation stage. In comparative example 1, a comparatively open layer was combined with a comparatively fine layer in a so-called two-stage structure. All structures were adjusted such that they fulfill a degree of separation that fulfills market requirements and then compared with regard to pressure loss. Surprisingly, in examples 1 and 2, without employing a fine stage as in the comparative example with a reduced air permeability (in the comparative example 130 l/m²s), the requirements in regard to degree of separation were fulfilled and improvements in regard to pressure loss were obtained while having acceptable stack dimensions.

What is claimed is:

1. A coalescence separator for separating liquid droplets from a gas flow, the coalescence separator comprising:
a multilayer structure comprised of a coalescence filter medium as a finest stage of the coalescence separator,
wherein the multilayer structure comprised of the coalescence filter medium is configured to be arranged between a gas inlet and a gas outlet and surrounds a cavity, and
wherein a product of an air permeability of the coalescence filter medium and a grammage of the coalescence filter medium amounts to at least 16 g/m*s and maximally 100 g/m*s.

2. The coalescence separator according to claim 1, wherein the coalescence filter medium is a glass fiber paper.

3. The coalescence separator according to claim 1, further comprising two end discs,
wherein the multilayer structure is fastened seal-tightly between the two end discs for lateral sealing.

4. The coalescence separator according to claim 1, wherein an individual layer thickness of the coalescence filter medium amounts to more than 0.1 mm and maximally 2 mm.

5. The coalescence separator according to claim 1, wherein an individual layer of the coalescence filter medium comprises a grammage larger than 40 g/m² and less than 200 g/m².

6. The coalescence separator according to claim 1, wherein the coalescence filter medium comprises a mass to volume ratio of less than 170 kg/m³ and larger than 80 kg/m³.

7. The coalescence separator according to claim 1, wherein an individual layer of the coalescence filter medium has an air permeability of more than 180 l/m²s and maximally 1,500 l/m²s.

8. The coalescence separator according to claim 1, wherein the multilayer structure comprises between 2 and 80 layers of the coalescence filter medium.

9. The coalescence separator according to claim 8, wherein layers of the coalescence filter medium are immediately arranged on each other and are either stacked or wound.

10. The coalescence separator according to claim 1, wherein the coalescence filter medium is a single layer.

11. The coalescence separator according to claim 10, wherein the single layer is homogenous.

12. The coalescence separator according to claim 1, wherein a total thickness of the multilayer structure amounts to at least 8 mm and maximally 60 mm.

13. The coalescence separator according to claim 1, wherein a total air permeability of the multilayer structure amounts to less than 100 l/m²s.

14. The coalescence separator according to claim 1, wherein the coalescence filter medium comprises glass fibers in a mass proportion of at least 50%.

15. The coalescence separator according to claim 1, wherein the coalescence filter medium comprises incinerable materials in a mass proportion of maximally 10%.

16. The coalescence separator according to claim 1, wherein the coalescence filter medium comprises a binder in a mass proportion of maximally 10%.

17. The coalescence separator according to claim 16, wherein the binder comprises no fibers selected from the group consisting of bi-component fibers and fusible fibers.

18. The coalescence separator according to claim 16, wherein the binder is an acrylate binder.

19. The coalescence separator according to claim 1, wherein the coalescence filter medium comprises fibers comprising one among hydrophobic properties, fibers comprising oleophobic properties, and fibers comprising hydrophobic properties and oleophobic properties.

20. The coalescence separator according to claim 1, wherein the coalescence filter medium comprises glass fibers, and
wherein at least 90% of the glass fibers have a fiber diameter larger than 0.5 μm.

21. The coalescence separator according to claim 1, wherein the coalescence filter medium comprises glass fibers, and
wherein at least 90% of the glass fibers have a fiber diameter of less than 10 μm.

22. The coalescence separator according to claim 1, wherein a finest separation stage of the coalescence separator is formed by the multilayer structure and/or the coalescence filter medium.

23. The coalescence separator according to claim 1, wherein the multilayer structure and/or the coalescence filter medium forms a separation stage determining at least an efficiency of the coalescence separator.

24. The coalescence separator according to claim 1, wherein the coalescence separator is configured as a first separation stage comprised of fibers and configured to be arranged downstream of a screw of a screw compressor.

25. The coalescence separator according to claim 24, wherein the fibers are glass fibers.

26. The coalescence separator according to claim 1, wherein the coalescence separator is configured as an exchangeable coalescence separator insert for exchangeable installation in a pressure container of a compressed air compressor.

27. The coalescence separator according to claim 1, wherein the coalescence separator is configured as a main oil separator of a screw compressor, the coalescence separator further comprising a fine coalescing separator arranged downstream of the multilayer structure for post separation of residual oil in a compressed air flow of the screw compressor.

28. A compressed air compressor system, comprising:
a pressure container for stationary compressors, or a separator cartridge housing, the pressure container or the separator cartridge housing being embodied as a spin-on filter and mountable on a connecting head; and
a coalescence separator according to claim 1,
wherein the coalescence separator is arranged exchangeably in the pressure container or in the separator cartridge housing to be exchangeable together with the separator cartridge housing.

* * * * *